Jan. 27, 1931.  J. W. HOLT  1,790,421
WHEEL RIM LOCKING STRUCTURE
Filed Oct. 7, 1926  2 Sheets-Sheet 1
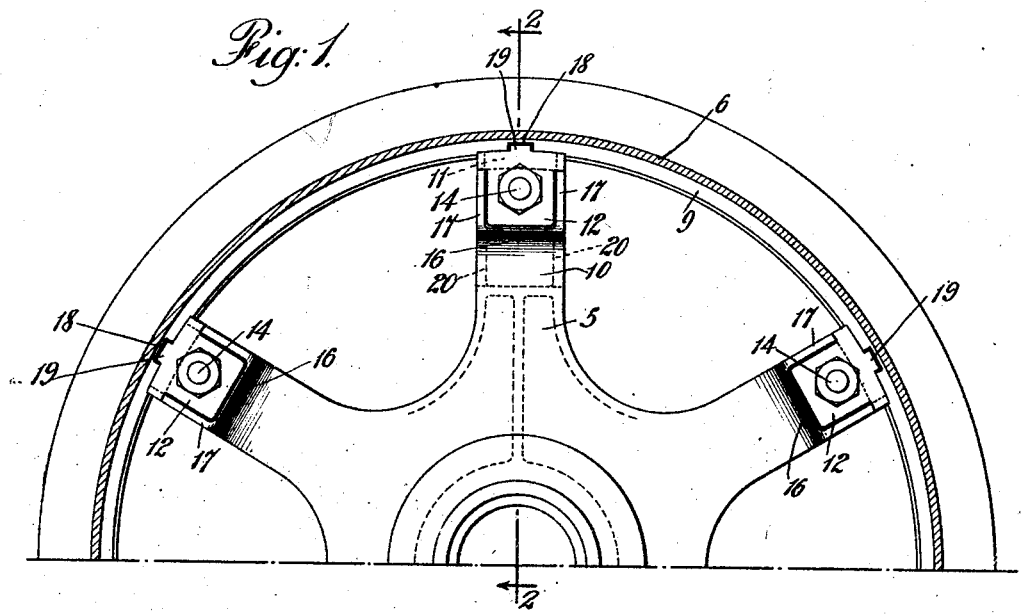
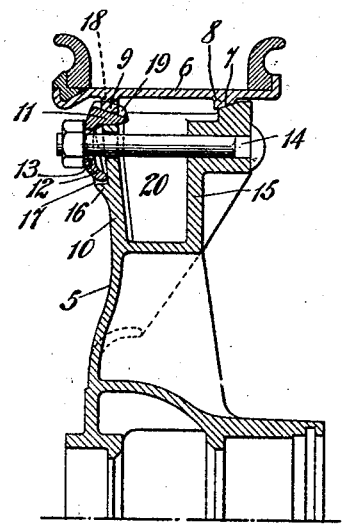
Inventor
John W. Holt
By his Attorney
Clarence D Kerr Jan. 27, 1931.  J. W. HOLT  1,790,421
WHEEL RIM LOCKING STRUCTURE
Filed Oct. 7, 1926  2 Sheets-Sheet 2
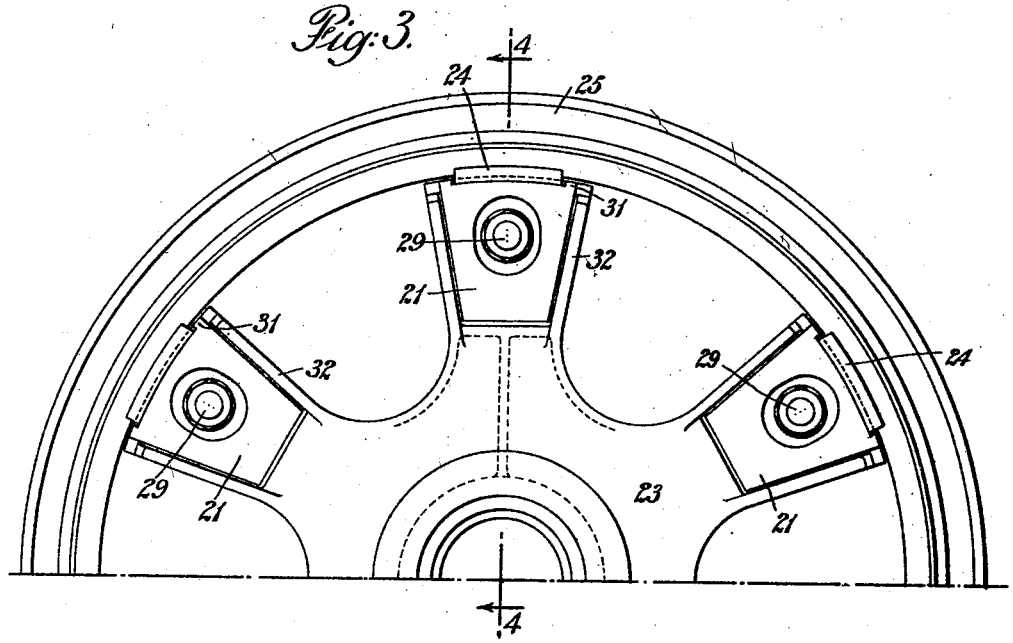
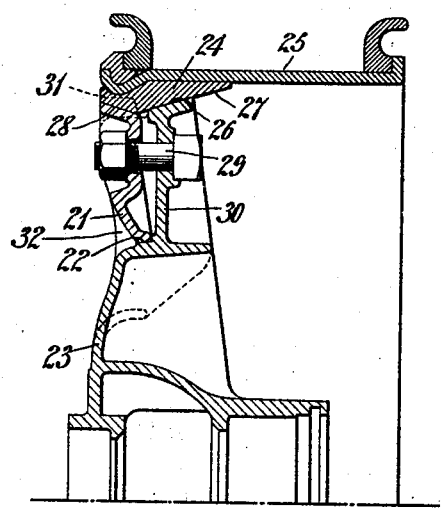
Inventor
John W. Holt
By his Attorney
Clarence A. Kerr Patented Jan. 27, 1931

1,790,421

UNITED STATES PATENT OFFICE

JOHN W. HOLT, OF CLEVELAND, OHIO, ASSIGNOR TO NATIONAL MALLEABLE AND STEEL CASTINGS COMPANY, OF CLEVELAND, OHIO, A CORPORATION OF OHIO

WHEEL-RIM-LOCKING STRUCTURE

Application filed October 7, 1926. Serial No. 139,963.

Fig. 1 is a view partly in front elevation and partly in vertical section of a wheel spoke and rim interlocking structure embodying the invention; Fig. 2 is a view in vertical section taken on the line 2—2 of Fig. 1; Fig. 3 is a view similar to Fig. 1 showing a modified form of the invention; and Fig. 4 is a vertical sectional view taken on the line 4—4 of Fig. 3.

My invention relates to the construction of wheels for automotive vehicles, and has for an object the provision of means for preventing circumferential movement of the wheel rim relative to the spoke members. With this end in view the invention comprises means for locking the rim to the spoke-end structure through the intermediary of an interlocking engagement between the rim and the wedge or the toggle member employed in holding the rim to its seat on the ends of the spoke members. Other features of the invention will be hereinafter described and claimed.

Referring to the drawings for a more detailed description of the invention, in Fig. 1 there is shown the end portion of a vehicle wheel spoke 5 and an adjacent rim portion 6 seated directly on the end of the spoke 5. The spoke member 5 is provided at its inner side with an inclined seat 7 on which is received a correspondingly inclined rib member 8 of the rim 6. The outer or forward portion of the rim 6 is also provided with a rib member 9. Between the rib member 9 of the rim 6 and a forwardly located resilient strut member 10, formed integrally with the spoke member 5, a wedging clip member 11 is adapted to be interposed to force and hold the rim member 6 in seated position on the ends of the spoke members 5 of the wheel structure.

This organization of structure follows very closely that described in my prior application for patent, Serial No. 113,363, the resilient strut member 10 being in particular a common feature of the present application and the prior application referred to.

The wedging clip member 11 is provided with a downwardly extending body portion 12 having a perforation 13 therein through which a bolt may be passed and extended through corresponding perforations in the forward wall or strut member 10 of the spoke and a rearward wall 15 thereon to clamp the wedging clip member 11 into holding relation to the rim member 6, as is clearly shown in Fig. 2 of the drawings.

Preferably the shoulder 16 is extended vertically as at 17 on each side of the member 12 in order to provide a seat or housing for the clip member structure.

An important feature of the invention resides in the provision which is made for locking the rim member 6 against circumferential movement on the spoke members 5. In Figs. 1 and 2 of the drawings this feature takes the form of an interlocking relation that is provided between the clip member 11 and the rib or bead member 9. This interlocking relation of the members takes the form of a notch or recess 18 formed in the bead or rib member 9 and into which a radially extending projection or lug 19, formed on the clip member 11, projects, as is clearly shown in Figs. 1 and 2 of the drawings. It will be seen that this relation of the clip member 11 and the rim member 6 is such as to prevent circumferential movement of the rim member with relation to the ends of the spokes on which it is mounted. Lateral movement of the clip member 11 is prevented by the flanking projection 17 on the strut member 10 as well as by engagement of the wedge portion 11 of the clip member between wing or flange members 20 forming the side walls of the spoke structure. The movable relation of the clip member 11, which is thus provided, also relieves the bolt 14 passing therethrough from shearing stresses, as will be seen.

Referring to Figs. 3 and 4 of the drawings, there is shown a modified form of the invention in which instead of a wedging clip member, such as shown in Figs. 1 and 2, a toggle member 21 is provided which is adapted to be forced between a shoulder 22, formed on the forward face of the spoke member 23, and a lug member 24 attached to the under surface of the rim 25. The spoke member 23 is provided with a terminal seat 26 having an inclined formation adapted to receive a correspondingly inclined face 27 of the lug member 24. It will be seen that an oppositely inclined face 28 of the lug member 24 is adapted to be received on the upper inclined face of the toggle member 21. A bolt 29, passing through the wall 30 of the spoke structure and through the toggle member 21, is adapted to pull the parts into close adjacency to each other to thereby force the toggle member into holding relation to the lug member 24 carried by the rim 25.

In this form of the invention an interlocking relation is provided between the toggle member 21 and the lug member 24 carried by the rim 25 through the provision of upwardly extending projections 31 formed on the toggle member 21 in flanking relation to the lug member 24 which is carried by the rim 25. Thus, it will be seen that circumferential movement of the rim with relation to the spoke members is prevented since the lug member 24, which is permanently attached to the rim structure, is restrained from circumferential movement by the position which it occupies between the upstanding lugs or ears 31 on the engaging toggle member 21. Lateral movement of the toggle member 21 in its seat is prevented by the flanking wings or flanges 32 forming the side walls of the spoke structure.

It will be seen that in the two forms of the invention which I have described provision is made to prevent circumferential movement of the rim with relation to the spoke members and that this is accomplished without the addition of parts specially formed for the purpose on the rim members. In one case an attached lug member, which is normally provided, is utilized in conjunction with a specially formed toggle member. In the other case a simple notch formed in a bead projecting from the rim member cooperates with a corresponding lug or projection on a wedging clip member used in holding the rim in place on its seats.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:—

In a vehicle wheel construction, a tire supporting rim, spoke members formed with inclined seats adjacent the inner edges of their terminal portions, an inclined bead member on the rim adapted to engage said seats, an inclined bead member formed on the rim adjacent the outer edge thereof, a resilient strut member forming part of the outer face of a spoke member adjacent the terminal portion thereof, a seat formed on the outer face of the strut member, a clip member mounted in said seat and having a wedge-shaped portion adapted to be forced into position between the outer edge of the strut member and the last-named bead member, lateral flange members forming side walls in the outer end of the strutted spoke member, an interlocking connection formed between the rim member and said clip member, and said wedge portion of said clip member extending into position between said lateral flange members on the spoke member whereby to prevent lateral movement of said clip member.

JOHN W. HOLT.